(No Model.)

J. P. MÜLLER.
LIQUID MEASURE.

No. 362,393. Patented May 3, 1887.

WITNESSES:
William Miller
Otto Hufeland

INVENTOR
John P. Müller
BY
Van Santvoord & Hauff,
ATTORNEYS

UNITED STATES PATENT OFFICE.

JOHN P. MÜLLER, OF BROOKLYN, NEW YORK, ASSIGNOR OF ONE-HALF TO JOHN E. HEUÄCKER, OF JERSEY CITY, NEW JERSEY.

LIQUID-MEASURE.

SPECIFICATION forming part of Letters Patent No. 362,393, dated May 3, 1887.

Application filed September 9, 1886. Serial No. 213,128. (No model.)

*To all whom it may concern:*

Be it known that I, JOHN P. MÜLLER, a citizen of the United States, residing at Brooklyn, in the county of Kings and State of New York, have invented new and useful Improvements in Liquid-Measures, of which the following is a specification.

This invention relates to a liquid-measure of that class which are intended for drawing from a tank stated quantities of liquid contained therein.

The particular improvements which constitute my invention are pointed out in the following specification and claims, and illustrated in the accompanying drawings, in which—

Figure 1:
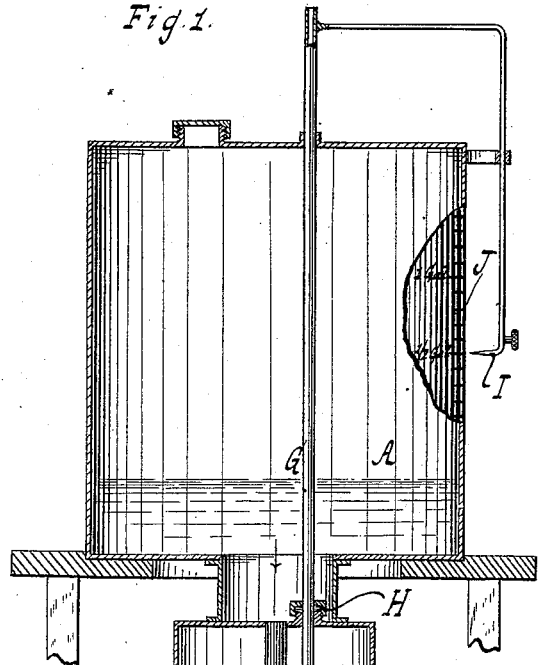
Figure 3:
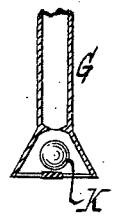
Figure 2:
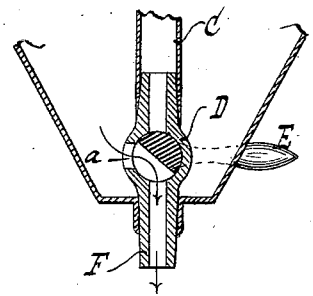

Figure 1 represents a vertical central section. Fig. 2 is a similar section of the measuring-vessel, showing the two-way cock in its discharging position, on a larger scale than the previous figure. Fig. 3 is a section of the inner end of the regulating-pipe.

Similar letters indicate corresponding parts.

In the drawings, the letter A designates the tank or reservoir from which the liquid to be measured is drawn. To the bottom of this tank is firmly secured the measuring-vessel B, and from the top of this vessel descends a pipe, C, which is open above, and the bottom end of which connects with a two-way cock, D, both the vertical pipe C and the two-way cock being located inside the measuring-vessel. The shell of this two-way cock extends through the sides of the measuring-vessel and is connected to the same by solder or other suitable means, to prevent leakage. To one end of the plug of the said cock is secured the handle E, and in the side of the shell is an opening, *a*, leading into the measuring-vessel. Said shell extends through the bottom of the measuring-vessel and forms the discharge-spout F. When the handle E of the cock D is turned to the position shown in Fig. 1, the measuring-vessel B is brought into communication with the tank A; but if the handle of the cock D is turned to the position shown in Fig. 2 the communication between the tank and the measuring-vessel is closed and the discharge-spout F is brought into communication with said measuring-vessel. With the measuring-vessel is combined a vent-pipe, G, which extends through an opening in the top of the tank A and through a stuffing-box, H, in the top of the measuring-vessel, so that said pipe can be moved up and down and at the same time the escape of the air from the upper part of the measuring-vessel round the sides of the vent-pipe is prevented by the stuffing-box.

On the top of the vent-pipe is secured an index, I, which points to a scale, J, marked on or secured to the outside surface of the tank A. This scale may be made to indicate gallons and fractions thereof, or it may be made to indicate any other desired measure. When the index I is set to half a gallon, as shown in Fig. 1, and the two-way cock is turned to the position shown in that figure, the liquid from the tank A runs down into the measuring-vessel until it reaches the mouth of the vent-pipe, and as soon as this mouth is closed by the liquid the air in the upper part of the measuring-vessel begins to become compressed and the flow of the liquid stops, the measuring-vessel being so formed that when one-half a gallon of liquid has flowed into it the mouth of the vent-pipe becomes closed.

In order to obtain a correct measure, it is requisite that the vent-pipe shall pass a certain distance below the top of the measuring-vessel, so that the body of air above the mouth of the vent-pipe becomes confined in the upper part of the measuring-vessel and the liquid is not liable to rise much, if any, up into the vent-pipe. If desired, however, a floating valve, K, may be placed in a chamber at the mouth of the vent-pipe, (see Fig. 3,) so that as soon as the liquid reaches the desired level the valve is pressed up against the mouth of the vent-pipe, and by closing said mouth prevents the liquid from rising up in the vent-pipe.

I am aware that prior to my invention an adjustable measuring-chamber for faucets has been composed essentially of a can or vessel closed, so as to form an air-chamber, and having an adjustable air-escape tube furnished with a valve and float and passing through its top to allow the escape of such a quantity of air from the can or vessel as is necessary to admit into the vessel the amount of fluid that it is desired to draw, said vessel being mounted on a two-way valve having a pipe-connection with a tank. Such construction I therefore disclaim.

What I claim as new, and desire to secure by Letters Patent, is—

1. The combination of the tank A, the measuring-vessel B, the two-way cock D, located inside the measuring-vessel and having the lateral opening $a$ communicating therewith, the pipe C, extending vertically within the measuring-vessel and having its lower end connected with the cock within the vessel and its upper end opening through the top wall of the vessel and communicating with the tank, the vertically-adjustable air-pipe G, the index I, and the scale J, substantially as and for the purposes described.

2. The combination of the tank A, the measuring-vessel B, connected directly to and suspended from the bottom of the tank, the two-way cock D, located inside the measuring-vessel and having a lateral opening, $a$, communicating therewith, with the shell of the cock projecting through the vessel into a discharge-spout, F, the pipe C, extending vertically within the vessel and having its lower end connected with the cock and its upper end passing through the top wall of the vessel and opening directly into the bottom of the tank, and the vertically-adjustable air-escape pipe G, substantially as and for the purposes described.

In testimony whereof I have hereunto set my hand and seal in the presence of two subscribing witnesses.

JOHN P. MÜLLER. [L. S.]

Witnesses:
W. HAUFF,
E. F. KASTENHUBER.